(12) United States Patent  (10) Patent No.: US 7,227,639 B2
Schmitt  (45) Date of Patent: *Jun. 5, 2007

(54) METHOD AND APPARATUS FOR DETERMINING A COLOR AND BRIGHTNESS OF AN LED IN A PRINTED CIRCUIT BOARD

(75) Inventor: Kevin Schmitt, Hoffman Estates, IL (US)

(73) Assignee: Test Coach Corporation, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/397,283

(22) Filed: Apr. 4, 2006

(65) Prior Publication Data

US 2006/0170923 A1    Aug. 3, 2006

Related U.S. Application Data

(63) Continuation of application No. 10/713,439, filed on Nov. 14, 2003, now Pat. No. 7,023,554.

(51) Int. Cl.
*G01N 21/25*  (2006.01)
(52) U.S. Cl. ..................................... 356/419
(58) Field of Classification Search ................. 356/419
See application file for complete search history.

(56) References Cited

U.S. PATENT DOCUMENTS

| 4,611,116 A | 9/1986 | Batt |
| 4,681,454 A | 7/1987 | Breemer |
| 4,775,640 A | 10/1988 | Chan |
| 4,808,815 A | 2/1989 | Langley |
| 5,065,007 A | 11/1991 | Tanaka |
| 5,381,103 A | 1/1995 | Edmond et al. |
| 5,568,267 A | 10/1996 | Sunamori et al. |
| 6,127,783 A | 10/2000 | Pashley et al. |
| 6,490,037 B1 | 12/2002 | Schmitt |
| 6,623,142 B1 | 9/2003 | Lippmann et al. |
| 2004/0251404 A1 | 12/2004 | Duijve |

FOREIGN PATENT DOCUMENTS

| EP | 0 285 493 A2 | 10/1988 |
| GB | 2 364 118 A | 1/2002 |
| JP | 03-133183 | 6/1991 |
| JP | 2000-223746 | 8/2000 |

OTHER PUBLICATIONS

*Programmable Color Light-to-Frequency Converter (specification sheet)*, Texas Advanced Optoelectronic Solutions Inc., pp. 1-9, Feb. 2003.

*Primary Examiner*—Gregory J Toatley, Jr.
*Assistant Examiner*—Kara Geisel
(74) *Attorney, Agent, or Firm*—Pauley Petersen & Erickson

(57) ABSTRACT

A method and apparatus for determining a color and brightness of an LED includes a sensor having a plurality of filters and an output probe connected to the sensor, the output probe providing a color output and a brightness output in a single signal. The sensor may further include an input probe connected to the sensor providing power and a ground probe connected to the sensor providing a grounded connection to the sensor. The plurality of filters in the sensor are preferably configured in a matrix array of color receptors having different colors.

9 Claims, 2 Drawing Sheets

METHOD AND APPARATUS FOR DETERMINING A COLOR AND BRIGHTNESS OF AN LED IN A PRINTED CIRCUIT BOARD

CROSS REFERENCE TO RELATED APPLICATION

This application is a continuation of U.S. patent application, Ser. No. 10/713,439, filed on 14 Nov. 2003 now U.S. Pat. No. 7,023,554. The parent application is hereby incorporated by reference herein in its entirety and is made a part hereof, including but not limited to those portions which specifically appear hereinafter.

BACKGROUND OF THE INVENTION

1. Field of the Invention

This invention relates to a method and apparatus for verifying a color of an LED in a printed circuit board.

2. Description of Related Art

Printed circuit boards often contain one or more light emitting diodes (LEDs) used as external signals, internal diagnostics and for other suitable applications. Typically, verification of the operation of a printed circuit board having LEDs required powering up a fully rendered printed circuit board and manually verifying the operation of the LEDs. Alternatively, a test fixture may be constructed including bulky and expensive fiber optics that extend between the printed circuit board to be tested and a test system.

Alternatively, verification of the operation of LEDs within a printed circuit board may be accomplished without a power supply such as described in U.S. Pat. No. 6,490,037, issued to Schmitt, which is hereby incorporated by reference in its entirety in a manner consistent with the present document.

Determination of the color and brightness of the LEDs, beyond mere verification, typically requires extensive calibration and set-up to align sensors with the LEDs and run the wiring necessary for sending numerous signals to determine such parameters of the LEDs.

SUMMARY OF THE INVENTION

A method and apparatus for determination of a color and brightness of an LED according to a preferred embodiment of this invention eliminates much of the time-consuming and costly procedures required by manual determination and the equally costly test fixtures requiring time-intensive and complex set-up and calibration.

The apparatus according to a preferred embodiment of this invention includes a sensor having a plurality of filters arranged in a matrix array, similar to a checkerboard. Each filter is preferably a discrete optical filter or color receptor which permits only light from a target wavelength of the color to be detected to pass. The plurality of filters preferably include: a plurality of clear receptors; a plurality of red receptors; a plurality of blue receptors; and a plurality of green receptors. The different color receptors are preferably interspersed within the matrix.

Sensor further includes three probes, specifically, an output probe, an input probe and a ground probe. The output probe may be connected to the sensor to provide a color output and a brightness output in a single signal. The input probe may be connected to the sensor to provide power to the sensor and the ground probe accordingly may be connected to the sensor to provide an external ground.

A microprocessor is preferably connected between the filters and the output probe and to calculate the color and the brightness of the LED. The microprocessor is programmable to permit adjustments of the sensor based upon variables within the system to be tested such as LEDs having atypical colors, brightness, positions, ambient conditions and other parameters that may require customization and/or programming of the microprocessor.

A method for testing an output of an LED according to a preferred embodiment of this invention includes positioning the sensor adjacent an LED having an unknown color and brightness. A color and a brightness of the LED is thereby determined with the microprocessor and a single output signal is sent from the sensor to some form of operator interface such as a voltmeter, a counter, a multimeter or similar measuring device known to those having ordinary skill in the art.

Specifically, a color and brightness of the LED is determined by sampling the output of the LED for a period of time. A count for each color receptor is then determined based upon the given period of time. Each sample or count across each color receptor is then compared to each other count to determine the color of the LED. A relationship of the count relative to the frequency of the single output signal is then calculated to determine the color of the LED. The frequency is further encoded with a pulse width and a DC average of the pulse width is measured to obtain the brightness of LED.

It is one object of this invention to provide a method and apparatus for accurately and inexpensively determining a color and brightness of an LED.

It is yet another object of this invention to provide a method and apparatus for determining a color and brightness of an LED that can utilize a single output signal.

It is another object of this invention to provide a method and apparatus for determining a color and brightness of an LED in a printed circuit board without requiring advance calibration.

It is yet another object of this invention to provide a method and apparatus for determining a color and brightness of an LED wherein existing test fixtures can be adapted for use in connection with the apparatus.

It is still another object of this invention to provide a method and apparatus for determining a color and brightness of an LED that does not require placement of optical cables.

One or more of the preceding objects maybe accomplished with one or more of the various embodiments of the invention described in more detail below.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

According to one preferred embodiment of this invention, an apparatus and system for determining a color and brightness of LED 15 in printed circuit board 90 is shown in FIGS. 1–4. LEDs 15 are typically used in printed circuit boards 90 and require verification and determination of their operation in a different manner than the traditional manner of verification of the placement and operation of integrated circuits within printed circuit board 90. LEDs 15 are available in clear/white and several common colors such as red, green and blue. Beyond mere verification of the operation of LED 15, it is also preferable, and an object of this invention, to determine the color and brightness of LED 15, in part to confirm that such LED is in the desired position in printed circuit board 90 and functions as intended.

The apparatus according to a preferred embodiment of this invention includes sensor 10. As described in more detail below, sensor 10 comprises an assembly of components that may be used in connection with test systems and test fixtures for quickly and accurately determining a color and brightness of LED 15. Sensor 10, otherwise known as a SMART FINN™ sensor, is preferably positioned in physical proximity to LED 15 to be tested.

Figure 1:
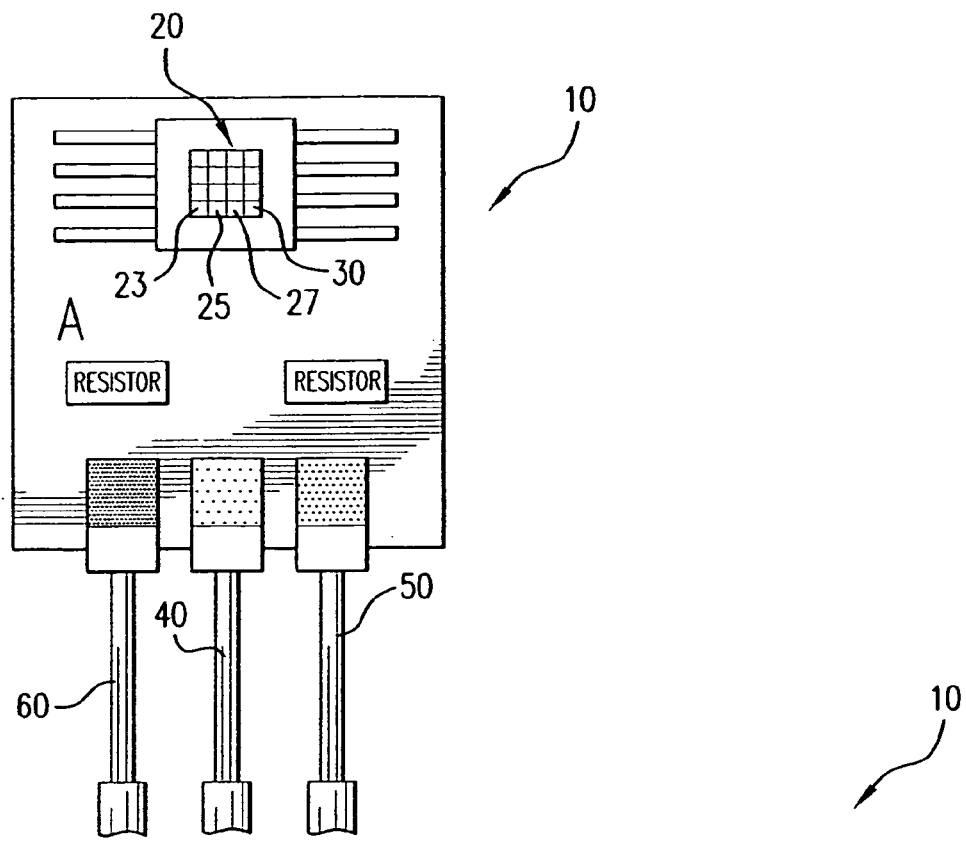
FIG. 1 is a schematic front view of a sensor according to one preferred embodiment of this invention.

According to one preferred embodiment of this invention, and as shown in FIG. 1, sensor 10 preferably includes a plurality of filters 20 arranged in a matrix. Each filter 20 is preferably a discrete optical filter or color receptor which permits only light in a range about the target wavelength of the color to be detected to pass. As such, each filter 20 is preferably designed to detect a certain range of color, e.g. blue, red, green and/or clear. As shown in FIG. 1, the plurality of filters 20 preferably include: a plurality of clear receptors 23; a plurality of red receptors 25; a plurality of blue receptors 27; and/or a plurality of green receptors 30. Preferably, the different color receptors 23, 25, 27 and 30 are interspersed within the matrix. An example of such a filter 20 is manufactured by TAOS Inc. of Plano, Tex., part number TCS230D.

Figure 2:
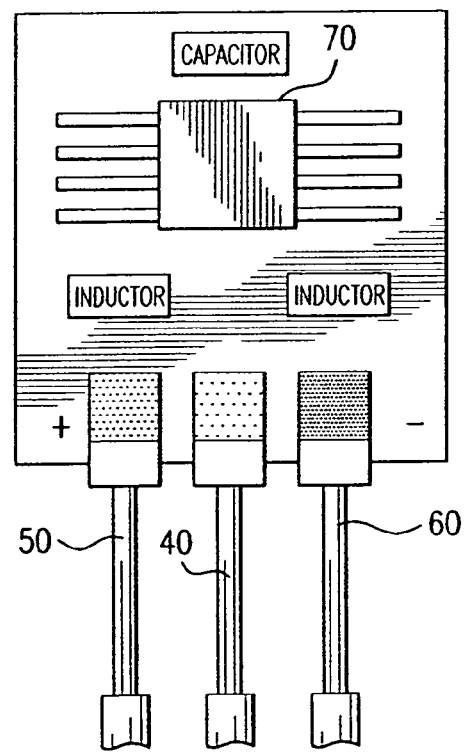
FIG. 2 is a schematic rear view of the sensor shown in FIG. 1.
Figure 3:
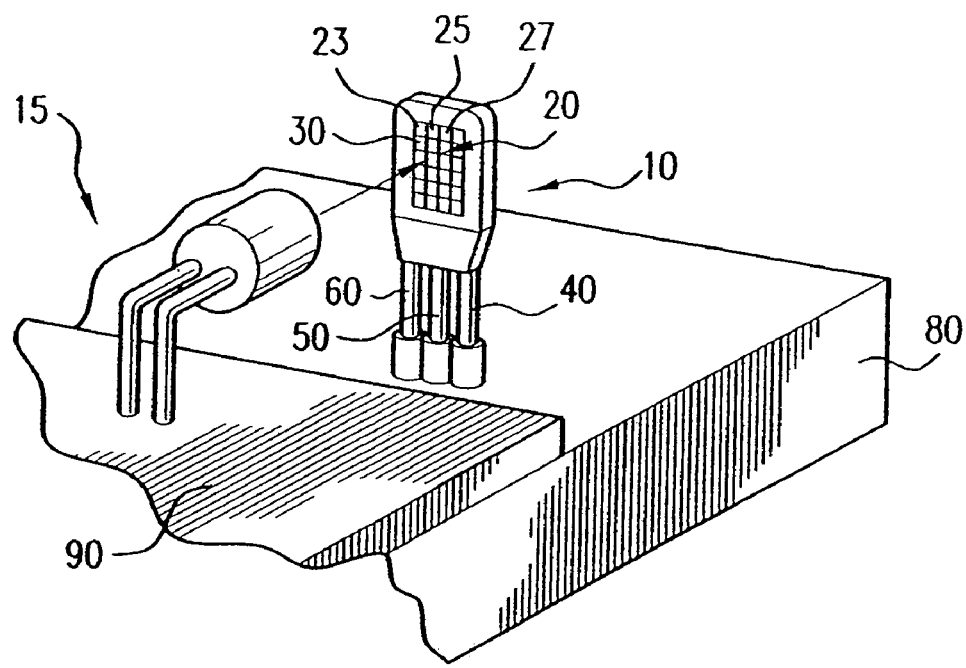
FIG. 3 is a diagrammatic perspective front view of a portion of a test fixture according to one preferred embodiment of this invention.
Figure 4:
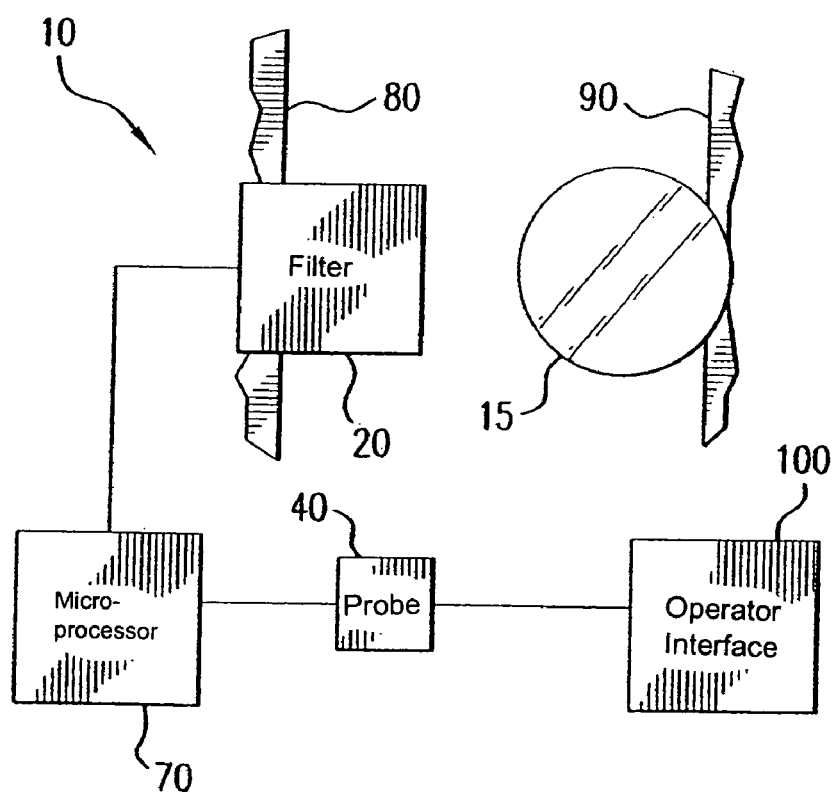
FIG. 4 is a schematic of test apparatus according to one preferred embodiment of this invention.

According to one preferred embodiment of this invention, sensor 10 includes a minimum amount of connections, or probes, to minimize the necessary set-up and installation of sensor 10. Accordingly, and as shown in FIGS. 1 and 2, sensor 10 preferably includes three probes, specifically, output probe 40, input probe 50 and ground probe 60. Output probe 40 is preferably connected to sensor 10 and provides a color output and a brightness output in a single signal. According to a preferred embodiment of this invention, this single signal is made possible by a method of operation described in more detail below. Such single signal through a single output probe 40 thereby simplifies the connections necessary to connect sensor 10 relative to LED 15 within the test system.

Input probe 50 is preferably connected to the sensor and provides power to sensor 10 from an external power source. Input probe 50 preferably accommodates an operating voltage between approximately 2.7 Vdc and 5.5 Vdc. Input probe 50 may draw power directly from a digital output. Ground probe 60 is preferably additionally connected to sensor 10 and is connected to an external ground.

As shown in FIGS. 1–4, microprocessor 70 is preferably connected between filters 20 and output probe 40 and calculates the color and the brightness of LED 15. Microprocessor 70 may be programmable to permit modifications of sensor 10 based upon variables within the system to be tested such as LEDs 15 having atypical colors, brightness, positions, ambient conditions and other parameters that may require customization and/or programming of microprocessor 70.

According to one preferred embodiment of this invention and depending upon the application, probes 40, 50 and/or 60 each may configured in a straight path, may each include a 90° bend, may be pre-formed into other configurations and/or may be bendable to permit forming into suitable configurations.

A method for testing an output of LED 15 according to a preferred embodiment of this invention includes positioning sensor 10 adjacent LED 15 having an unknown color and brightness. As discussed above, sensor 10 includes a plurality of color receptors, preferably arranged in a matrix. A color and a brightness of LED 15 is thereby determined with microprocessor 70 connected with respect to sensor 10 and a single output signal is sent from sensor 10 to some form of operator interface 100 such as a multimeter, a voltmeter, a counter or similar measuring device known to those having ordinary skill in the art.

Specifically, a color and brightness of LED 15 may be determined by sampling the output of LED 15 for a period of time. The period of time may be dependent upon the brightness of LED 15 and/or the color of LED 15. A count for each color receptor 23, 25, 27 and/or 30 is then determined based upon the given period of time. A sample or count across each color receptor 23, 25, 27 and/or 30 is then compared to determine the color of LED 15. As such, sensor 10 sequentially compares the count for clear receptor 23 with the count for red receptor 25 with the count for blue receptor 27 with the count for green receptor 30 so that the count for each color receptor is compared with the count of each other color receptor. Comparison of the counts for each filter 20 thereby yields a wavelength and, thus, the color of LED 15.

The following table provides typical measurements for various colors of particular LEDs 15.

TABLE 1

| Characteristics of Specific Colors of LEDs | | | |
|---|---|---|---|
| LED Color | Wavelength (nm) | mcd | Frequency (kHz) | Vdc |
| Red | 635 | 150 | 12.0 | 3.5 |
| Amber | 608 | 10 | 10.6 | 1.0 |
| Yellow | 585 | 150 | 9.38 | 2.8 |
| Green | 565 | 150 | 8.68 | 2.0 |
| Blue | 430 | 100 | 6.90 | 3.4 |

In addition, the wavelength of the color is converted to a frequency. A relationship of the count relative to the frequency of the single output signal is then calculated to determine the color of LED 15. The frequency is further encoded with a pulse width and a DC average of the pulse width is measured to obtain the brightness of LED 15.

According to one preferred embodiment of this invention, sensor 10 may additionally detect white light and provide a signal indicating the presence of a broad range of colors in the light and/or the brightness of white light. If a dominant color is present within the white light, sensor 10 will preferably indicate such dominant color within the single output signal.

According to one preferred embodiment of this invention, a method for determining a color and brightness of LED 15 may be used in connection with printed circuit board 90 having a plurality of LEDs 15. A corresponding plurality of sensors 10 may thereby be positioned on test fixture 80 and printed circuit board 90 is then preferably positioned within test fixture 80 so that each sensor 10 is positioned directly adjacent an LED 15. According to two common configurations of LEDs 15 on printed circuit boards 90, LEDs 15 are positioned so that a light emitting surface is either positioned on an edge of printed circuit board 90 and thus perpendicular to surface of printed circuit board 90 or positioned in an interior area of printed circuit board 90 and thus parallel to surface of printed circuit board 90. Depending upon such configuration, probes 40, 50 and 60 may be correspondingly configured to permit direct light access from LED 15 to adjacent sensor 10. As such, probes 40, 50 and 60 may include an entirely straight length, a partially straight length or an entirely bent and/or curved length and/or some combination thereof.

According to one preferred embodiment of this invention, whether a light emitting surface of LED 15 is parallel or perpendicular to printed circuit board 90, sensor 10 is positioned at least approximately 0.10" away from the light emitting surface and up to approximately 0.20" or more away from the light emitting surface of LED 15. Factors such as the strength of the light source, the intensity of the light source and the amount of ambient light may result in variations of a preferred position of sensor 10 relative to LED 15. A center of an active region of sensor 10, likely a center of the matrix of filters 20, is preferably aligned with a center of a lens of LED 15.

While in the foregoing specification this invention has been described in relation to certain preferred embodiments thereof, and many details have been set forth for purpose of illustration, it will be apparent to those skilled in the art that the method and apparatus according to this invention are susceptible to additional embodiments and that certain of the details described herein can be varied considerably without departing from the basic principles of the invention.

I claim:

1. An apparatus for determining a color and brightness of an LED in a printed circuit board, the apparatus comprising:
   a sensor having a plurality of filters;
   an output probe connected to the sensor, the output probe providing a color output and a brightness output in a single signal;
   an input probe connected to the sensor, the input probe providing power to the sensor; and
   a ground probe connected to the sensor.

2. The apparatus of claim 1 wherein the plurality of filters comprise:
   a plurality of clear receptors;
   a plurality of red receptors;
   a plurality of blue receptors; and
   a plurality of green receptors, wherein the plurality of filters are interspersed in the sensor.

3. The apparatus of claim 1 further comprising:
   a microprocessor connected between the plurality of filters and the output probe for calculating the color and the brightness of the LED.

4. The apparatus of claim 1 wherein the input probe accommodates an operating voltage between approximately 2.7 Vdc and 5.5 Vdc.

5. An apparatus for determining a color and brightness of an LED in a printed circuit board, the apparatus comprising:
   a sensor having a plurality of filters having different colors;
   a microprocessor connected to the sensor, the microprocessor calculating the color and brightness of the LED; and
   an output probe connected to the microprocessor, the output probe outputting the color and the brightness through a single signal wire;
   wherein the plurality of filters comprise: a plurality of clear receptors; a plurality of red receptors; a plurality of blue receptors; and a plurality of green receptors, each receptor interspersed in the sensor.

6. A method for testing an output of an LED comprising:
   positioning a sensor adjacent an LED having an unknown color and brightness, the sensor having a plurality of color receptors;
   sampling the output of the LED for a period of time;
   determining a count for each color receptor of the plurality of color receptors;
   converting a wavelength of the color to a frequency;
   determining the brightness of the LED from a relationship of the count relative to the frequency;
   encoding the frequency to a pulse width; and
   measuring a DC average of the pulse width to obtain the color of the LED; and
   sending a single output signal from the sensor.

7. The method of claim 6 further comprising:
   detecting and indicating white light with the sensor.

8. The method of claim 6 further comprising before the sending step: comparing a sample across each color receptor of the plurality of color receptors to determine the color of the LED.

9. The method of claim 6 further comprising:
   arranging the plurality of color receptors in a matrix on the sensor.

* * * * *